UNITED STATES PATENT OFFICE.

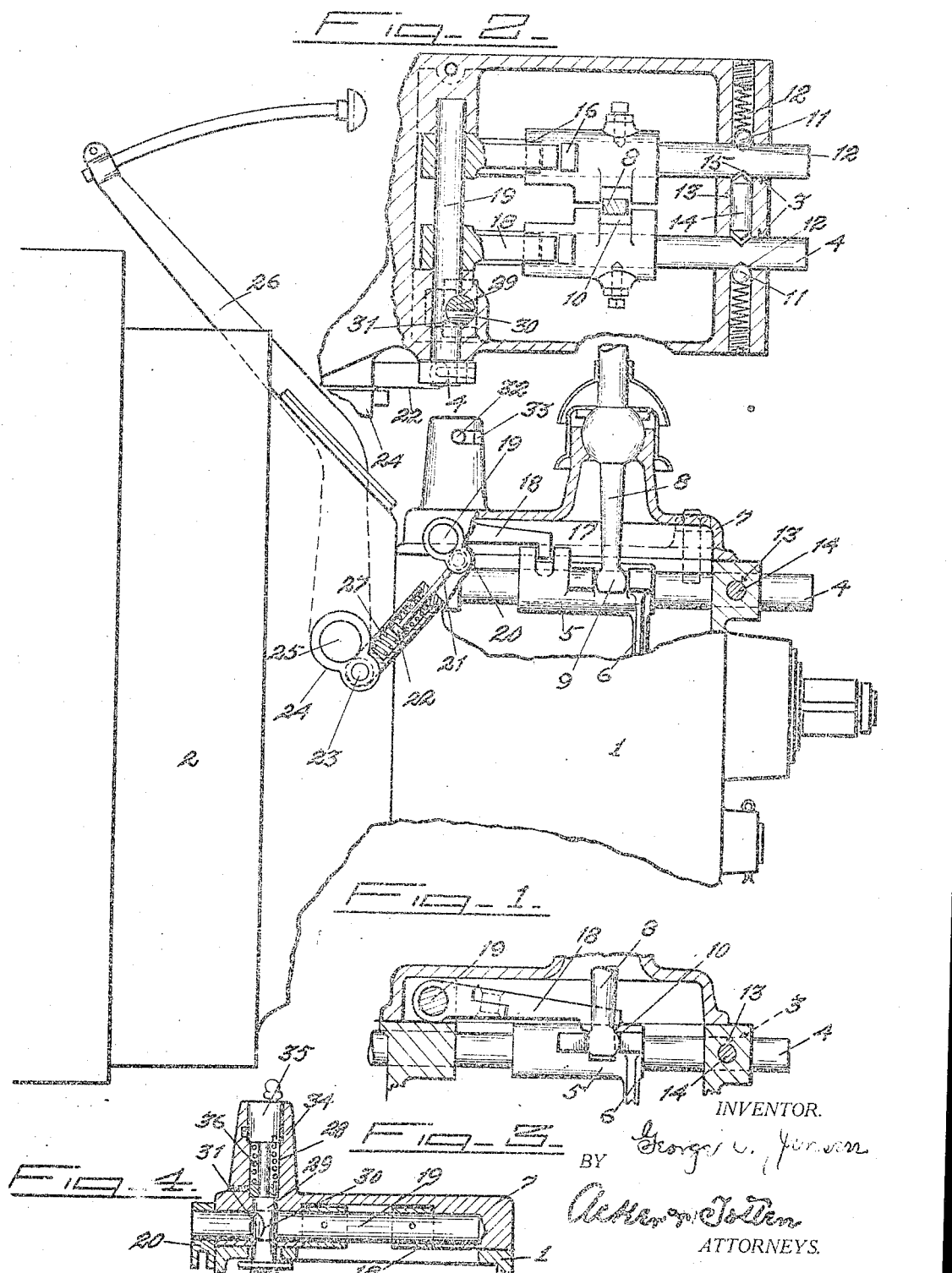

GEORGE C. JENSEN, OF OAKLAND, CALIFORNIA.

SHIFT-LOCK MECHANISM.

1,309,853.   Specification of Letters Patent.   Patented July 15, 1919.

Application filed December 24, 1918. Serial No. 268,191.

*To all whom it may concern:*

Be it known that I, GEORGE C. JENSEN, a citizen of the United States, residing at Oakland, in the county of Alameda and State of California, have invented certain new and useful Improvements in Shift-Lock Mechanism, of which the following is a specification.

The present invention relates to a locking construction for shifting devices, and has for its principal object to incorporate in a construction, wherein the operation of the clutch pedal to release the clutch permits of the operation of the shifting devices, a lock, whereby the shifting devices may be locked from operative movement and at the same time permitting the operation of the clutch.

With the above mentioned and other objects in view, the invention consists in the novel construction and combination of parts hereinafter described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

To more fully comprehend the invention, reference is directed to the accompanying drawings, wherein—

Figure 1 is a view in side elevation, partly in section, of the preferred embodiment of my invention.

Fig. 2 is a view in transverse section, taken on line 2—2 of Fig. 1.

Fig. 3 is a modified form of construction, wherein the locking fingers engage the lever.

Fig. 4 is a sectional view taken on line 4—4 of Fig. 2.

Referring more particularly to the drawings, wherein like characters of reference designate corresponding parts, 1 indicates a suitable gear casing, associated with which is an inclosing member 2, of any suitable form of clutch, the construction herein illustrated being in the form of what is commonly termed a unit power plant.

Slidably mounted in alined guide openings 3 in the end walls of the casing 1, are the parallel spaced shifter rods 4 having associated therewith the shifter devices 5 provided with arms 6 for engaging the variable speed power transmitting gears, not shown, and the operation of said shifter devices moves said gears to provide variable speeds for the power transmitting mechanism.

The top of the casing 1 is closed by a removable cover 7 carrying a universally fulcrumed lever 8, the lower end 9 of which is adapted to be received in either of the recesses 10 in adjacent faces of the shifter devices 5, thus permitting the operation of the devices, one at a time.

To prevent the movement of one of the rods 4 after the other has been shifted, the usual retaining means is employed, and the same consists in the spring pressed ball members 11 mounted in bores 12 in the end wall of the casing 1, said members adapted, when the shifter devices are moved into neutral position, to seat within the notched recesses 12 in the surface of the rods 4. Positioned between said rods 4, slidably mounted in a bore 13, is the member 14 pointed at its opposite ends and of a length to be moved into one of the notches 15 on the movement of the opposite rod, and thus preclude accidental shifting of both devices at the same time.

The shifter devices are formed on their upper surfaces with spaced lugs 16 between which are adapted to be seated the curved ends 17 of suitable fingers 18 carried by a rotatable shaft 19 mounted in the cover 7. One end of the shaft 19 extends exteriorly of the cover and carries a member 20 to which is pivotally connected at one end a plunger 21 extending into a cylinder 22 pivotally mounted, as at 23, to a member 24 on the shaft 25, which preferably coöperates through any suitable mechanism with a clutch throw-out yoke, not shown, said shaft being axially rotated by the operation of a clutch pedal 26 when it is desired to operate the clutch, not shown.

Interposed between the end of the plunger 21 and the opposite ends of the cylinder 22, are the springs 27, providing a yieldable connection between the pedal 26 and the shaft 19.

The engagement of the ends 17 of the fingers 18 between the lugs 16 on the shifter devices 5, prevents the operating of said shifter devices by the movement of the lever 8 until such time as the clutch pedal 26 is depressed, releasing the clutch and breaking the driving connection between the motor and the gears, thus preventing the shifting of the gears when the same are in motion. The flexible connection between the pedal 26 and shaft 19 permits the disengagement of the clutch member during such time as the shifter devices 5 are locked from operative movement, either in neutral position or in engaged position by the locking means hereinafter described.

Extending through the cover 7 and intersecting the bore in which the shaft 19 is rotatably mounted, is a suitable bore 28 in which is mounted for axial rotation the locking bolt 29, having a recess 30 adapted to receive the periphery of the shaft 19 and permit rotation of said shaft. The peripheral surface of the bolt is also adapted for reception in the corresponding recess 31 in the shaft 19 when it is desired to lock said shaft from movement.

The rotation of the bolt to locked position, as in Fig. 2 of the drawings, is accomplished by a suitable handle 32 extending through an opening 33 in the casing 34 surrounding said bolt, and the bolt is adapted to be held in locked position by a key controlled lock 35, of any suitable type. On the releasing of said lock through the actuation of the key, a spring 36 is adapted for rotating the bolt a one-quarter revolution to unlocked position, as in the modified construction illustrated in Fig. 3.

The fingers 18 are extended to a point where the curved ends of the same project into the recesses 10 in the shifter devices at opposite sides of the lever 8 and thus lock the lever from lateral or selective movement, and simultaneously locking the shifter devices from operation.

By my improved construction it will be apparent that the shifter devices are capable of operation only during such times as the clutch is in released position and then through the elevating of the fingers 18. However, the fingers may be locked in engagement with the lugs 16 either when the gears are in neutral or in engaged position, preventing operation of the vehicle, but should it be desired to manually move the vehicle in a garage or the like, the connection between the motor and the rear or driving wheels, may be broken or interrupted by the throwing out or releasing of the clutch.

Having thus described my invention, what I claim as new and desire to protect by Letters Patent is:—

1. A gear shifting device including a casing, gear shifter elements therein provided with stops, a hand device for operating said elements, swinging fingers coöperating with said elements for locking the same in their adjusted position, said fingers fulcrumed at one end and their free ends adapted for swinging movement into and out of engagement with said stops, and releasable lock controlled means for locking said fingers in engagement with said stops.

2. In combination with a variable speed power transmitting mechanism including shifter devices, of a clutch and operating means therefor for controlling the driving connection to said mechanism, means for operating said shifter devices, shifter device retaining means, a yieldable connection between said clutch operating means and said shifter device retaining means whereby said retaining means is released to permit the operation of said shifter devices on the release of said clutch, and means for locking said shifter device retaining means in engagement with said shifter devices, whereby the operation of said shifter devices is precluded on the release of said clutch.

3. In combination with a variable speed power transmitting mechanism including shifter devices, of a clutch and operating means therefor for controlling the driving connection to said mechanism, means for retaining said shifter devices from operative movement during the engagement of the clutch, a connection between said clutch operating means and said shifter device retaining means, and means for locking said shifter devices from movement without interfering with the operation of the clutch.

4. In combination with a variable speed power transmitting mechanism including shifter devices, of a clutch and operating means therefor for controlling the driving connection to said mechanism, means for retaining said shifter devices from operative movement during the engagement of the clutch, a connection between said clutch operating means and said shifter device retaining means, and means for locking said retaining means in engagement with said shifter devices whereby said devices are locked from movement without interfering with the operation of the clutch.

5. A gear shifting device including a casing, gear shifter elements therein provided with stops, a hand device for operating said elements, swinging fingers coöperating with said elements for locking the same in their adjusted position, said fingers fulcrumed at one end and their free ends adapted for swinging movement into and out of engagement with said stops, manually operated means independent of said hand operated device for swinging said fingers on their fulcrum, and releasable lock controlled means for locking said fingers in engagement with said stops.

6. A gear shifting device including a casing, a gear shifting element therein provided with a stop, a device for operating said element, movable means coöperating with said elements for retaining the same in its adjusted position, releasable lock controlled mechanism for locking said movable means in engagement with said stop to preclude movement thereof, and foot actuated means for operating said movable means on the release of said locking mechanism.

7. In combination with a variable speed power transmitting mechanism, including a casing and gear shift elements therein provided with stops, a clutch, means for operating said clutch to control the driving connection to said power transmitting mechanism, movable means coöperating with said elements for retaining the same in their adjusted position, releasable lock controlled mechanism for locking said movable means in engagement with said stops to preclude movement thereof, a connection between said clutch operating means and said movable means whereby the releasing of said clutch simultaneously operates said movable means to release the same from said stops, and a device for selectively operating said elements on the release of said movable means therefrom.

8. In combination with a variable speed power transmitting mechanism including gear shifting elements provided with stops, a clutch for controlling the driving connection to said power transmitting mechanism, a foot operated lever capable of movement for releasing said clutch, means coöperating with said elements for engagement therewith to retain the same in their adjusted position, a connection between said lever and said means whereby on the release of said clutch said means is released from engagement with said gear shifting elements to permit the operation thereof, a device for selectively operating said elements on the release of said means, and a lock device capable of operation to lock said means in engagement with said stops.

In testimony whereof I have signed my name to this specification in the presence of a subscribing witness.

GEORGE C. JENSEN.

Witness:
D. B. RICHARDS.